079;# United States Patent [19]

Tanai et al.

[11] 4,095,129
[45] June 13, 1978

[54] ROTOR ASSEMBLY FOR ELECTRO-MECHANICAL TRANSDUCER OF ELECTRONIC TIMEPIECE

[75] Inventors: Kunio Tanai, Sayama; Yasuaki Nakayama, Hanno; Yoshiro Hirai; Shigeru Aoyama, both of Tokorozawa; Yoshinobu Kashima, Tanashi, all of Japan

[73] Assignee: Citizen Watch Company Limited, Tokyo, Japan

[21] Appl. No.: 723,273

[22] Filed: Sep. 15, 1976

[30] Foreign Application Priority Data

| Sep. 22, 1975 | Japan | 50-1114557 |
| Dec. 25, 1975 | Japan | 50-159494 |
| Jan. 21, 1976 | Japan | 51-005751 |

[51] Int. Cl.$^2$ .................................................. H02K 37/00
[52] U.S. Cl. ........................................ 310/49 R; 310/156; 310/268; 58/23 D
[58] Field of Search .................. 310/49, 156, 268; 58/23 D

[56] References Cited

U.S. PATENT DOCUMENTS

| 3,231,770 | 1/1966 | Hyde | 310/156 |
| 3,235,760 | 2/1966 | Kober | 310/156 |
| 3,320,453 | 5/1967 | Kober | 310/156 X |
| 3,943,698 | 3/1976 | Ono | 310/156 X |

Primary Examiner—Donovan F. Duggan
Attorney, Agent, or Firm—Frank J. Jordan

[57] ABSTRACT

A rotor assembly for an electro-mechanical transducer of an electronic timepiece, in which a metallic protecting member is fixedly mounted on a rotary shaft. A rare earth magnet is fixedly supported at its outer periphery by the metallic protecting member.

4 Claims, 9 Drawing Figures

ROTOR ASSEMBLY FOR ELECTRO-MECHANICAL TRANSDUCER OF ELECTRONIC TIMEPIECE

This invention relates to electro-mechanical transducers for electronic timepieces and, more particularly, to a rotor assembly for such electro-mechanical transducers specifically suited for use in electronic wristwatches.

In conventional electronic wristwatches, electro-mechanical transducers such as stepping motors have been employed as a drive means to drive time-indication mechanisms. It is required that these motors be small in size, low in cost, light-weight and capable of delivering a high output torque with minimum power consumption. To this end, anistrophic rare earth magnets such as samarian cobalt ($SmCo_5$) have been increasingly used as rotors for the stepping motors. The rare earth magnets will meet the above-mentioned requirements to some extents. However, the stepping motors incorporating the rare earth magnets are still beset by low electro-mechanical transductance which does not permit power consumption to be sufficiently reduced. Another drawback is encountered in that the rare earth magnets are hard and brittle and thus involve difficulties in working, assembling and repair.

It is, therefore, an object of the present invention to provide an improved rotor assembly specifically suited for use in an electro-mechanical transducer of an electronic timepiece.

It is another object of the present invention to provide an improved rotor assembly which enhances the efficiency of electro-mechanical transduction of an electro-mechanical transducer so that power consumption can be reduced and the life of a timepiece battery extended.

It is still another object of the present invention to provide an improved rotor assembly which is easy to work, assemble and repair.

It is a further object of the present invention to provide an improved rotor assembly which is simple in construction and low in manufacturing cost.

These and other objects, features and advantages of the present invention will become more apparent from the following description when taken in conjunction with the accompanying drawings, in which.

Figure 1:
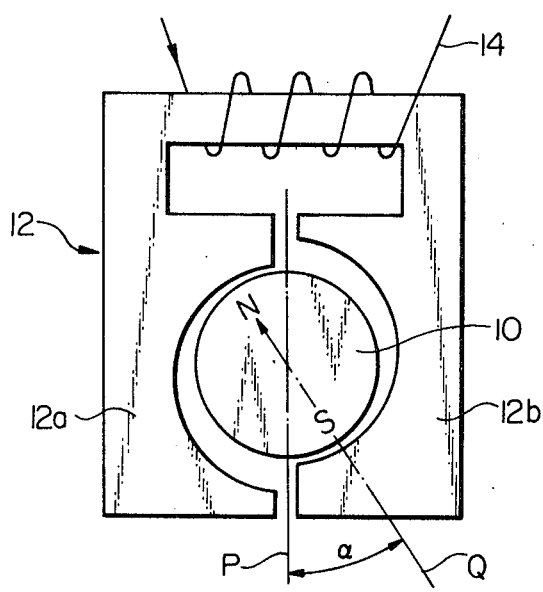
FIG. 1 is a schematic view of a conventional stepping motor.

Referring now to FIG. 1, there is shown an example of a conventional stepping motor for use in an electronic timepiece. As shown, the stepping motor comprises a permanent magnet rotor 10, and a stator 12 including stator pole pieces 12a and 12b which are driven by a driving coil 14. The stator pole pieces 12a and 12b are arranged such that the centers of radius of curvature are offset from each other and, thus, the rotor 10 may be stable on an axis Q of static equilibrium at a predetermined angle $\alpha$ with respect to the center line P. Consequently, the rotor 10 is rotated in a single direction by applying the alternating current pulses to the driving coil 14.

Figure 2:
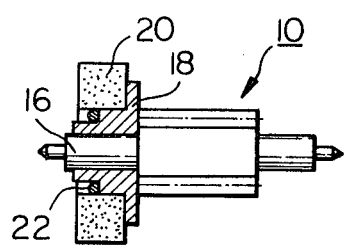
FIGS. 2 and 3 show examples of prior art rotor assembly for the stepping motor shown in FIG. 1.

As shown in FIG. 2, the rotor 10 is usually composed of a rotor pinion 16, a bush 18 and a magnet 20. During assembly, the rotor pinion 16 and the bush 18 are joined by forcing them together and the magnet 20 is adhered to the bush 18 by means of adhesive 22. In order to enhance the efficiency of transductance the co-axial alignment of the rotor pinion 16 and the magnet 20 as well as the inner and outer diameters should be worked to the highest possible precision. It is therefore necessary to attain a high degree of accuracy when working the magnet 20. However, this is quite difficult in view of the hardness and brittleness of sintered rare earth materials used for the magnet 20. A large number of processing steps are thus required to attain an inner diameter with a suitable accuracy and to eliminate eccentricity between the outer diameter and the shaft. These problems necessarily raise the production costs; approximately 50% of overall cost can be attributed to obtaining precise dimensions. Even a completed rotor is subject to damage due to its brittleness. Such damage can be sustained during the assembly of the stator upon impact or particularly when a foreign object falls between the rotor and the stator. This can terminate or impede rotation which can be fatal to a timepiece.

Figure 3:
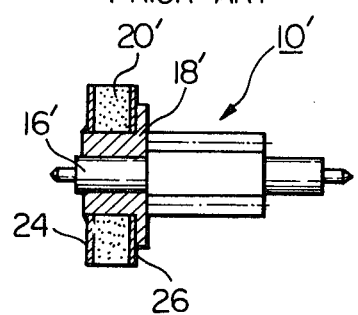

FIG. 3 illustrates another example of a conventional rotor partly in cross-section. In this example, the rotor 10' comprises a rotor pinion 16', a bush 18' press fitted thereto and metal plates 24 and 26 adhered to both surfaces of a rare earth magnet 20'. This construction affords protection for the both surfaces of the rotor but does not protect it along its outer periphery where it is nearest to the stator.

In still another example, although it is not shown, the bush 18' in FIG. 3 is eliminated and plates 24 and 26 are brought into direct pressured contact with the rotor pinion 16' by reducing their inner diameter. In this construction, however, the plates 24 and 26 adhered to both surface of the rare earth magnet 20' must, in order to bring them into perpendicular contact with the rotor pinion 16', be accurately fabricated so that the dimensions of their inner diameters are correct. This will result in higher costs.

Figure 4:
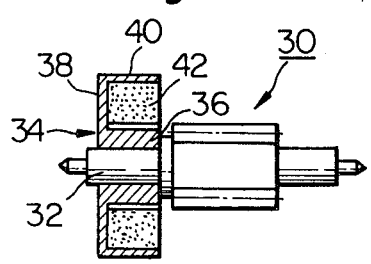
FIGS. 4, 5, 6 and 7 show preferred embodiments of a rotor assembly according to the present invention.

FIG. 4 illustrates a preferred embodiment of a rotor assembly according to the present invention which is specifically suited for use in an electro-mechanical transducer of an electronic timepiece. In this preferred embodiment, the rotor assembly 30 comprises a rotary shaft 32, a metallic protecting member 34 rotatably mounted on the rotor pinion 32 and composed of a boss portion 36, a radial wall 38 radially extending from the boss portion 36 and a cylindrical wall or ring 40 integral with the radial wall 38, and a ring-shaped rare earth magnet 42. The boss portion 36 of the metallic protecting member 34 is fixedly mounted on the rotor pinion 32 by press fitting. The rare earth magnet 42 is also press fitted into the inner wall of the ring 40 and fixedly supported at its outer periphery. One of the end faces of the magnet 42 engages with the radial wall 38. The inner diameter of the magnet 42 is slightly larger than the outer diameter of the boss portion 36 to provide an annular space therebetween. Accordingly, the inner diameter of the rare earth magnet 42 can be simply provided by a rough drilling process. It should be understood that since the protecting member 34 is made of metal it can be accurately worked to insure precise diametric and axial dimensions with respect to the axis of the rotor pinion 32. The outer diameter of the rare earth magnet 42 need only have the same precision as required in the conventional electro-mechanical transducers. In addition, since the rare earth magnet 42 is press fitted into the ring 40, the joint between the metallic protecting member 34 and the outer diameter of the magnet 42 is highly reliable. Moreover, the metallic protecting member 34 protects the outer periphery of the magnet 42 as well as its inner periphery during handling. Further protection can be obtained by extending a part of the metallic protecting member 34 beyond the exposed surface of the magnet 42.

Figure 5:
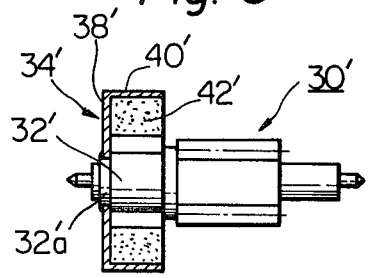

FIG. 5 shows another preferred embodiment of the rotor assembly according to the present invention. In this illustrated embodiment the metallic protecting member 34' comprises a radial wall 38' fixedly supported on a rotor pinion 32', and a cylindrical wall or ring 40' integrally formed therewith to fixedly support a rare earth magnet 42'. The radial wall 38' has a bore though which a reduced diameter portion 32'a of the rotor pinion 32' extends. An adhesive is either applied to the reduced diameter portion 32'a of the rotor pinion 32' or filled in the gap between the shaft 32' and the inner diameter of the rare earth magnet 42'. Thus, the accuracy of the inner diameter of the magnet 42' and its co-axial alignment with respect to the rotor pinion 32' can be assured. by the metallic protecting member 34' which can readily be worked to precise dimensions. When it is desired to enhance the performance of the rotor assembly by increasing its volume it is possible to decrease the inner diameter of the magnet 42' and thus thicken it in the radial direction. A more compact rotor can be obtained by shortening both the inner and outer diameter of the magnet 42'.

Figure 6:
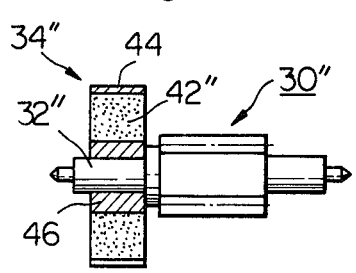

FIG. 6 shows still another preferred embodiment of the rotor assembly of the present invention. In this embodiment, the metallic protectuing member 34" comprises a cylindrical ring 44 and a bush 46. The outer periphery of the rare earth magnet 42 " is press fitted into the metallic ring 44 so that when the bush 46 is press fitted into the inner diameter of the rare earth magnet 42" the magnet 42" is prevented from breaking. In this case the accuracy of the inner diameter of the magnet 42" need only be provided to the same degree as was required in the prior art rotor assembly. Since the metallic protecting ring 44 is tightly fitted on the outer periphery of the magnet 42", the bush 46 can be press fitted onto the rotor pinion 32" in a highly reliable manner. It is also possible to reduce the radial thickness of the magnet 42" and thus produce a thinner timepiece.

Figure 7:
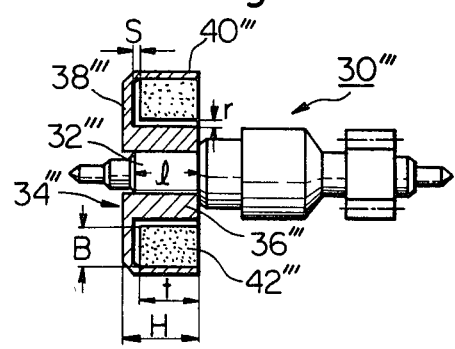

FIG. 7 illustrates a further preferred embodiment of the rotor assembly according to the present invention. This illustrated embodiment is similar in construction with the first embodiment shown in FIG. 4 except that a gap S is provided between the radiall wall 38'" of the metallic protecting member 34'" and the end face of the magnet 42'". The gap S compensates for any lack of accuracy in the longitudinal thickness t of the magnet 42'", thus obviating the necessity for precise processing. In addition, since the length t of the magnet 42'" is selected to be greater than the radial thickness B, the magnet 42'" itself as well as the length of the peripheral connection between it and the metallic member 34'" can be lengthened to reduce the likelihood of vibration and axial misalignment 7 of the magnet 42'". Accordingly, only the outer periphery of the magnet 42'" need be precisely worked. Since, moreover, the connection between the metallic member 34'" and the magnet 42'" is lengthened, the connection l between the mettalic member 34'" and the rotor pinion 32'" can be made shorter than the thickness H of the metallic member 34'". Thus, the over-all length of the rotor pinion 32'" can be shortened, making it possible to provide a miaturized electro-mechanical transducer having a reduced thickness. The gap r between the magnet 42'" and the boss portion 36'" provides the advantages as already stated with reference to the embodiment of FIG. 4.

Figure 8:
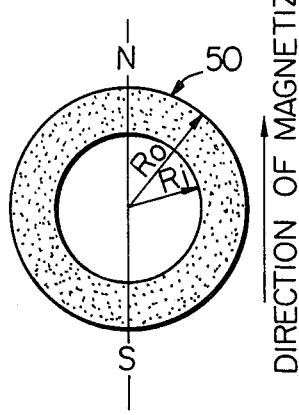
FIG. 8 is a plan view of another preferred embodiment of a rotor assembly according to the present invention.

FIG. 8 shows an enlarged plan view of rotor magnet 50 to be used for the rotor assembly according to the present invention. The rotor magnet 50 is made of an anistrophic rare earth magnet such as samarian cobalt ($SmCo_5$) exibiting an energy product of at least 16 $MGO_e$. The inner radius (Ri) of the magnet 50 is approximately 0.4 mm, the outer radius (Ro) approximately 0.65 mm, and the ratio Ro/Ri within the range 1.2 to 2.0.

Figure 9:
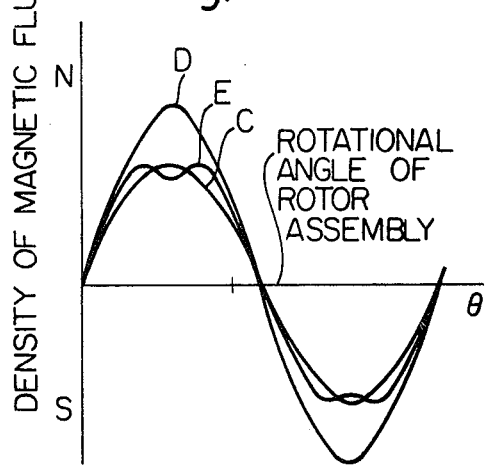
FIG. 9 is a magnetic flux density distribution chart for the rotor assemblies.

FIG. 9 represents a magnetic density distribution chart for a rotor magnet, with the rotational angle of a rotor assembly shown along the abscissa and the magnetic flux density shown along the ordinate. The curve C represents the magnetic flux density of a conventional rotor assembly consisting of a platinum cobalt magnet. The curve D indicates the magnetic flux density of a conventional rotor assembly consisting of a samarium cobalt magnet. The curve E shows the magnetic flux density of a ring-shaped rotor magnet 50 shown in FIG. 8.

As may be readily understood from the structure of the rotor magnet 50 shown in FIG. 8, the effective length of the magnet can be shortened with respect to the overall length of the rotor assembly which allows the permeance of the rotor magnet 50 to be lowered to 0.5-2.0. This also permits the permeance to be effectively reduced when the rotor assembly is employed in an electro-mechanical transducer as part of an operating magnetic circuit, whereby the optimum permeance of a high performance magnet can be approached. As a result, the rotor assembly according to the present invention can be manufactured in low cost since the same effective magnetic flux can be obtained with a rotor assembly employing less magnetic material than was required in the conventional rotor magnet. With a smaller amount of material used in the rotor magnet, the moment of inertia of the rotor is reduced which is extremely advantageous when starting the electro-mechanical transducer. Various tests have revealed that operation of the electro-mechanical transducer employing the rotor assembly of the present invention is stable at a low current of 1.8 uA.

When it was attempted to reduce the power consumption of a motor using a rotor consisting of a high performance magnetic material, the result was a higher magnetic flux density as illustrated by the curve D in FIG. 9. Such a rotor when employed in a motor necessitates a high driving voltage which makes excessive demands upon the type of battery which is used in electronic timepieces. The present invention, however, provides a more level curve, as shown by E in FIG. 9, allowing for stable operation of the electro-mechanical transducer well within the limits imposed by the requirements of batteries used in electronic timepieces. It is thus possible to provide a rotor assembly which enables the size of an electro-mechanical transducer to be reduced and which is low in cost since a high performance magnet such as a rare earth magnet with energy product of at least 16 MGOe is used. Advantages are also obtained from the inherent construction of the rotor assembly and power consumption can be reduced so that the effective life of a battery may be extended.

It will now be appreciated from the foregoing description that a rotor assembly of the present invention provides an increased electro-mechanical transductance which reduces power consumption of an electromechanical transducer. It should also be noted that the rotor assembly according to the present invention can be manufactured in low cost and with high precisions. Another advantage resides in the fact that since a rotor magnet forming part of the rotor assembly according to the present invention is prestressed with compression along its outer periphery by the action of a protecting member, the rotor magnet is easy to work, assemble and repair. In this respect, it should be noted that the rare earth magnet is brittle against tension and rather strong against compression and, for this reason, the present invention features to dispose the rotor magnet in the protecting member by press fitting along its outer periphery.

While the present invention has been shown and described with reference to particular embodiments, it should be noted that various other changes or modifications may be made without departing from the scope of the present invention. For example, although the protecting member has been described as being made of a metallic member, it may be made of any other suitable material such as plastic material, if desired.

What is claimed is:

1. A rotor assembly for a stepping motor of an electronic timepiece comprising:
   a rotor pinion;
   a metallic protecting member including a boss portion fixedly mounted on said rotor pinion, a radial wall radially extending from said boss portion, and a cylindrical wall integral with said radial wall; and
   a rare earth magnet press fitted to said cylindrical wall and having an inner wall larger in diameter than said boss portion to provide an annular space therebetween, said rare earth magnet being formed in a ring-shape and having an inner diameter less than about 4 mm, the ratio of the outer radius of said rare earth magnet to the inner radius thereof ranging between 1.2 and 3 and said rare earth magnet having an energy product of at least 16 MGOe.

2. A rotor assembly according to claim 1, in which said boss portion of said metallic protecting member is press fitted to said rotor pinion.

3. A rotor assembly according to claim 1, in which the length of said rare earth magnet is greater than the radial thickness thereof, the connection between said rotor pinion and said protecting member being smaller in length than the thickness of said metalic protecting member.

4. A rotor assembly for a stepping motor of an electronic timepiece comprising:
   a rotor pinion;
   a metallic protecting member including a radial wall fixedly secured to said rotor pinion, and a cylindrical wall integral with said radial wall; and
   a rare earth magnet press fitted to the cylindrical wall of said metallic protecting member and having an inner wall larger in diameter than said rotor pinion to provide an annular spacing therebetween, said rare earth magnet being formed in ring-shape and having an inner diameter less than about 4 mm, the ratio of the outer radius of said rare earth magnet to the inner radius therof ranging between 1.2 and 3 and said rare earth magnet having an energy product of at least 16 MGOe.

* * * * *